March 2, 1937.  H. ROSENTHAL  2,072,409
METERING MEANS
Filed Feb. 1, 1934
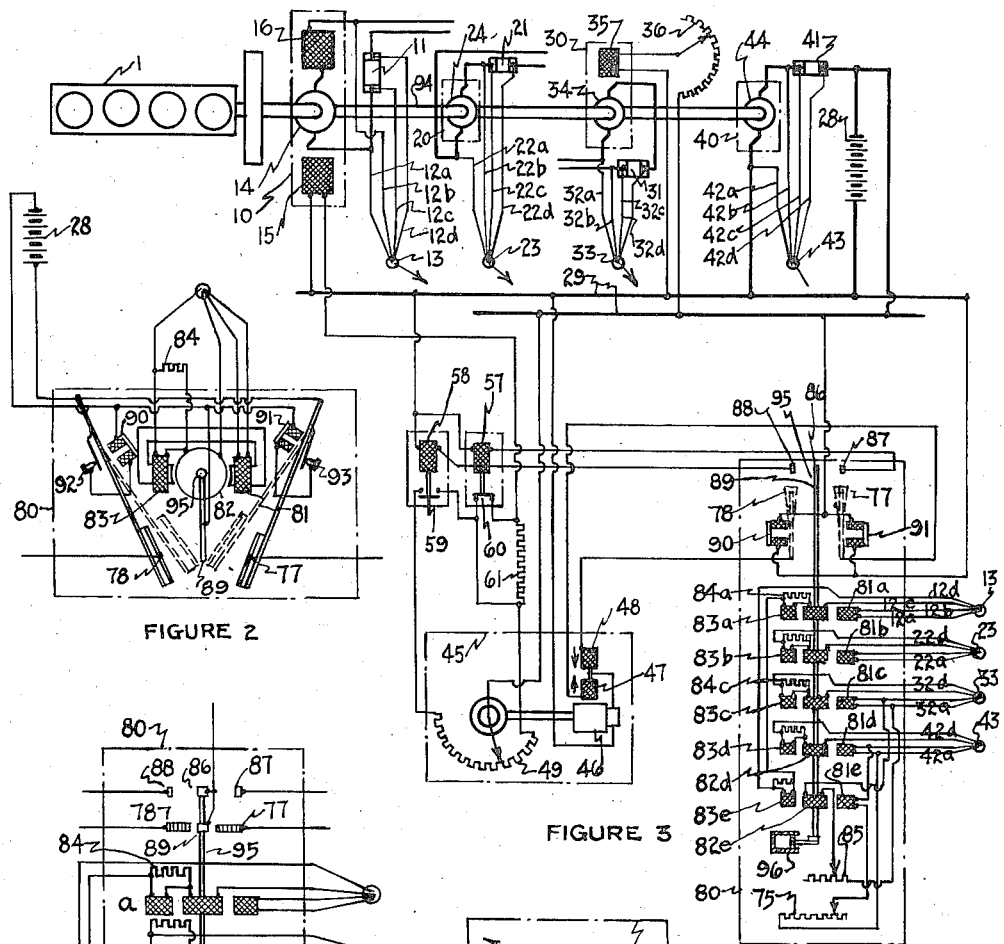
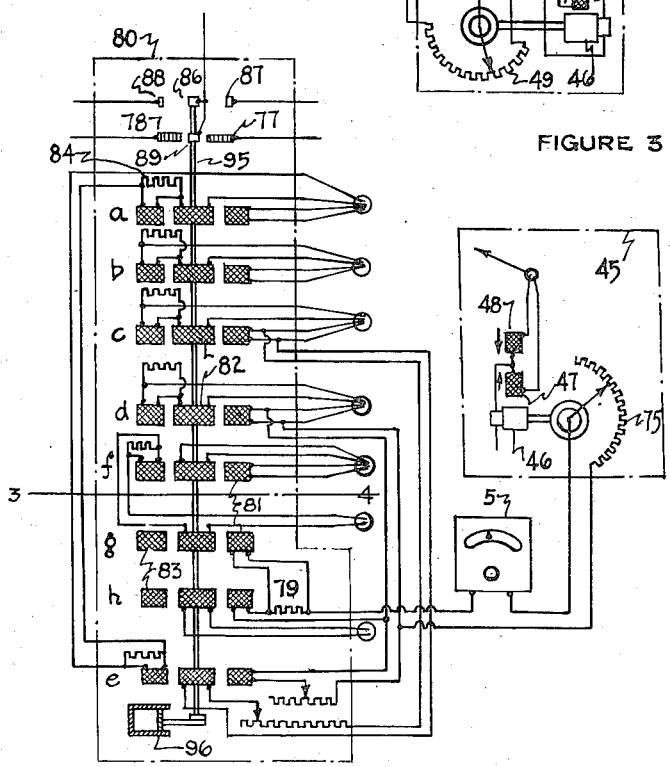
Henry Rosenthal
INVENTOR Patented Mar. 2, 1937

2,072,409

UNITED STATES PATENT OFFICE 2,072,409

METERING MEANS

Henry Rosenthal, New York, N. Y.

Application February 1, 1934, Serial No. 709,262

17 Claims. (Cl. 171—95)

My invention relates particularly to means of measuring and controlling torque of one or more electric generators. However, I do not limit my invention to this particular use, as it may be used for many other purposes.

The object of my invention is to provide metering means whereby one function can be metered in terms of two or more other functions having such relationship to each other that the function it is desired to measure is a quotient.

This invention is a continuation in part of my invention Serial 666,819 filed April 19, 1933, in which is claimed the herein described metering means in combination with a prime mover-generator set.

The present invention is applicable as a metering means either for the purpose of measuring or for the purpose of controlling by means of the metered function. The type of function for which my invention may be used can be expressed broadly by the following algebraic equation, where F is the function to be metered $$F = \frac{(A \pm aB)B \pm (A_1 \pm a_1 B_1)B' \pm (A_2 \pm a_2 B_2)B_2 \pm \ldots \pm (A_n \pm a_n B_n)B_n \pm N(CD)}{(C \pm bD)D \pm (C_1 \pm b_1 D_1)D_1 \pm \ldots \pm (C_m \pm b_m D_m)D \pm M(AB)} \quad (1)$$

One or more of the factors in the above equation may be a constant, and in the measurement of the combined torque of one or more generators driven by a single prime mover the equation takes the form $$F = \frac{AB + A_1 B_1 + A_2 B_2 + \ldots + A_n B_n}{CD} \quad (2)$$

where the A factor is the current, the B factor the voltage of each generator and C is a constant value, while the D factor is the speed of the prime mover, or $$T = \frac{EI + E_1 I_1 + E_2 I_2 + \ldots + E_n I_n}{K.S} = \frac{W + W_1 + W_2 + \ldots + W_n}{KS} \quad (3)$$

Therefore, for this particular adaptation of my invention, I thus use a number of wattmeter elements, (one for each generator) which are connected to a common shaft. If each wattmeter element measures the power of a separate generator, the sum of the force produced by the elements on the shaft will be proportional to the total power delivered by all the generators, if the wattmeter elements are properly designed. If the restraining force which opposes the movement of the common shaft, upon which the wattmeter elements are mounted, varies proportionally to the speed of the prime mover driving the generators, then when the force of the wattmeter elements balances the force of the restraining element, the power will be proportional to the speed of the prime mover, and will therefore be substantially proportional to the brake-torque of the generators. Such a metering element may be used as a relay to control the field of one of the generators by the torque of the combined generators and thus serve as a means of regulating the torque imposed upon the prime mover, or it may be used simply as a means of measuring the combined torque wherever it may be desired to do so.

It can readily be seen that my present invention is not limited to the purpose of metering torque, but can be used with any function fitting the general Equation (1) or modifications of this general equation, a number of which modifications are given below:

$$F = \frac{KA}{kD} \quad (4)$$

$$F = \frac{K(A + A_1 + A_2 + \ldots + A_n)}{kD} \quad (5)$$

$$F = \frac{K(A + A_1 + A_2 + \ldots + A_n)}{k(D + D_1 + D_2 + \ldots + D_m)} \quad (6)$$

$$F = \frac{K(A + A_1 + A_2 + \ldots + A_n)}{CD + C_1 D_1 + C_2 D_2 + \ldots + C_m D_m} \quad (7)$$

$$F = \frac{KA}{k(D + D_1 + D_2 + \ldots + D_m)} \quad (8)$$

$$F = \frac{KA}{CD + C_1 D_1 + C_2 D_2 + \ldots + C_m D_m} \quad (9)$$

$$F = \frac{AB + A_1 B_1 + A_2 B_2 + \ldots + A_n B_n}{kD} \quad (10)$$

$$F = \frac{AB + A_1 B_1 + A_2 B_2 + \ldots + A_n B_n}{k(D + D_1 + D_2 + \ldots + D_m)} \quad (11)$$

$$F = \frac{AB}{kD} \quad (12)$$

$$F = \frac{AB}{k(D + D_1 + D_2 + \ldots + D_m)} \quad (13)$$

$$F = \frac{AB}{CD + C_1 D_1 + C_2 D_2 + \ldots + C_m D_m} \quad (14)$$

$$F = \frac{AB}{CD} \quad (15)$$

$$F = \frac{KA}{CD} \quad (16)$$

$$F = \frac{K(A + A_1 + A_2 + \ldots + A_n)}{CD} \quad (17)$$

Where the function to be measured has the form of Equations (1), (2), (3), (5), (7), (10), (11), and (17), the actuating portion of my metering means will comprise a plurality of elements. Where the function to be measured has the form of Equations (4), (8), (9), (12), (13), (14), (15), and (16), the actuating portion of my metering means will comprise a single element. Where the function to be measured has the form of Equations (1), (6), (7), (8), (9), (11), (13), and (14), the restraining portion of my metering means will comprise a plurality of elements. Where the function to be measured has the form of Equations (2), (3), (4), (5), (12), (15), (16), and (17), then the restraining portion of my metering means will comprise a single element. It is not necessary to construct a separate type of my metering means to fit each of the equations shown above or such other modifications as can be made, but a single type adapted to meter a function of the type of Equation (1) will be adapted for use with any of the other forms given, simply by reducing to zero the actuating force for one or more of the parts and/or by supplying an actuating force of constant value for one or more of the parts.

In my application 666,819, I control the restraining torque on the prime mover at a decreasing value with increase in power output, and the metering means operates in accordance with the following equation:

$$T = \frac{(E_1+a_1I_1)I_1+(E_2+a_2I_2)I_2+ \ +(E_n+a_nI_n)I_n}{(K-bI)s}$$

in which $a, a_2$—$a_n$ may be zero when the equation will take the form—

$$T = \frac{E_1I_1+E_2I_2+ \ +E_nI_n}{(K-bI)s}$$

or $b$ may be zero and the equation take the form—

$$T = \frac{(E_1+a_1I_1)I+(E_2+a_2I_2)I_2+ \ +(E_n+a_nI_n)I_n}{Ks}$$

In each case, the actuating elements and the restraining elements will balance each other at lower torque values as the power increases.

My invention is shown diagrammatically in the accompanying drawing but I do not limit it to the form shown. My invention will better be understood by reference to the following description taken together with the attached drawing forming a part of this specification, and in which—

Figure 1 shows schematically in elevation the essentials of one embodiment of my invention.

Figure 2 shows schematically a plan view of Figure 1.

Figure 3 shows schematically the application to the metering and controlling of the torque of a number of generators driven by a single prime mover.

In the figures similar numbers refer to like parts.

I will first explain my invention by describing its operation as applied to metering and controlling the torque in a prime mover-dynamo set. I will then explain its broader application.

Referring to Figure 3, the prime mover 1, is connected by suitable means, such as shaft 94, to the electric generators 10, 20, 30, and 40. The generator 10 is the principal generator; the generator 40 as shown is a constant potential variable speed generator connected to charge battery 28; generator 30 as shown is adapted to generate a potential proportional to the speed of the prime mover; and generator 20 as shown is of any type as may be required.

Generator 30 is for direct current and has a separately excited field 35 excited from the battery bus 29 through the adjustable resistance 36. As the field 35 remains constant for any position of the adjustable resistance 36, the potential developed will be substantially proportional to the rotative speed of the armature 34 and so of the prime mover 1.

Generator 10 is shown for direct current and as having an armature 14, a series field 16, and a separately excited field 15, the latter being excited from the battery bus 29 through the resistance 61 and a portion of resistance 49 of the motor operated rheostat 45. The amount of these resistances in the circuit is controlled by the metering means 80, the operation of which will be explained later.

Generator 10 has in series with it a shunt 11. The current leads 12c and 12d from the shunt, as well as the potential leads 12a and 12b from the generator, are conducted through conduit 13 to the metering means 80.

Similarly generator 20 has shunt 21; current leads 22c and 22d; potential leads 22a and 22b; and conduit 23 through which the current and potential leads are conducted to the metering means 80. In a like manner generator 30 has shunt 31 and generator 40 has shunt 41, and the current and potential leads from these generators are conducted to the metering means 80 in conduit 33 from generator 30 and conduit 43 from generator 40. The potential leads for the two generators are 32a and 32b and 42a and 42b respectively; the current leads are respectively 32c and 32d and 42c and 42d.

For each generator connected to the prime mover there is shown one set of current and potential leads connecting the prime mover to the metering means 80, and for each set of current and potential leads from a single generator there is a separate wattmeter element on relay 80. Such an element is best illustrated in Figure 2 which shows a plan view of a single element having the compound field comprising the potential element 81 and the current element 83, the latter being in series with the armature 82, and being shunted by the resistance 84.

As shown in Figure 3, there are four such wattmeter elements, one for each of the four generators. The field potential coils are labeled 81a, 81b, 81c, and 81d for generators 10, 20, 30, and 40, respectively. The armatures of each of the wattmeter elements are connected to the common shaft 95 which carries the rotating contacts 86 and 89. These wattmeter elements are all connected to cause a rotation of the shaft 95 to the right (Figure 3), counterclockwise (Figure 2).

Also connected to the common shaft is the armature 82e of a wattmeter element having the compound field 81e and 83e. This armature 82e is energized through adjustable resistance 85 by the variable potential of generator 30 which is proportional to the speed of the prime mover and is conducted to metering means 80 by leads 32a and 32b. The field 81e is energized by the constant potential of the battery 28 and conducted to the relay 80 by the potential leads 42a and 42b of the battery charging generator 40. The field 83e is energized by current from generator 10 and is connected in series with relay coils 81a and 84a, being shunted by a suitable resistance. This wattmeter element is connected to rotate the shaft 95 in a direction opposed to the other wattmeter elements and acts as the restraining and balancing force for the metering means.

Dashpot 96, connected to the shaft 95, acts to steady the action of the metering means and to prevent the relay contacts being made from extraneous forces.

The action of the metering means can best be explained by first neglecting the action of the modifying compound field coils 83a, 83b—83e. Coil 81a acting on the armature 82a causes a torque on shaft 95 proportional to the power delivered by generator 10. Similarly coil 83b acting on armature 82b causes a torque on shaft 95 proportional to the power delivered by generator 20. Likewise, coil 81c and armature 82c cause a torque proportional to the power delivered by generator 30; and coil 81d and armature 82d cause a torque proportional to the power delivered by generator 40. If these separate wattmeter elements are adjusted so that the torque of each is to the torque of the others as the power of the respective generators, then the actuating torque on the shaft 95 is always proportional to the sum of the power delivered by all of the generators connected to the prime mover. I prefer that all of the actuating elements be identical insofar as the coils and armatures are concerned and that proper relationship between the elements be secured through proper selection of shunts 11, 21, 31 and 41, but it is not essential that all of the actuating elements be alike as proper proportionality between the various elements may be obtained by variation in the windings to suit the generators and shunts.

The restraining element has a field 81e, with fixed value, being connected to the battery 28, and an armature 82e, the strength of which is proportional to the speed of the prime mover, being connected through suitable resistance 85 to the variable voltage generator 30. The restraining torque on the shaft 95 is therefore proportional to the speed of the prime mover and, neglecting the action of the relay compound fields, as has been done in this and the foregoing paragraph, the balancing position of the relay is at some constant value of prime mover torque, depending on the adjustment of the controlling resistance 85, and regardless of the speed of the prime mover and the power delivered.

The action of modifying compound fields will now be explained, first considering the compounding field 83e of the restraining element which is connected in series with the armature 81a of the relay and is in parallel with a suitable shunting resistance 84e. The actuating current for field 83e is therefore proportional to the load current of main generator 10. The field 83e is so connected that the combined field 81e and 83e decreases in strength as the load current increases. Therefore the actuating force decreases progressively as the load current and power of the main generator increases, and the relay having a decreasing restraining force will act to control the field of the main generator in such a manner that the main generator will deliver a progressively lower torque as its load increases.

The compounding field 83a of the actuating element shown as the upper element of the relay is connected to act cumulatively with field 81a of the same relay element. Coil 83a in parallel with shunt 84a is connected in series with the armature 81a of the same element. Its actuating current is therefore proportional to the load current of the generator 10 whose power is measured by this element. With coil 83a connected cumulatively with field 81a, the force of this relay actuating element will increase progressively as the load current and power of the main generator increases, and the relay will act to control the field of the main generator in such a manner that the main generator will deliver a progressively lower torque as its load increases.

Each of the other elements of the metering means may have a compounding field in series with the armature and shunted by a suitable resistance as shown. These compounding fields should be connected cumulatively with their respective potential coils. By proper selection of the compounding fields and their respective shunts, the torque can be made to fall with increasing load in any manner desired. Furthermore, it is not necessary that both the restraining element and the actuating element be provided with compounding fields as the modifying action can be obtained with the compounding of the restraining element alone, or by compounding of the main actuating element alone.

The lower contact 89 on the relay shaft 95, when displaced to the right touches the vibrating contact 77 and furnishes battery current to the motor operated rheostat 45 through the field 47 of the rheostat motor. This operates the motor in a direction whereby the amount of resistance 49 in the field circuit of the main generator is increased and the field strength of the main generator is reduced. Displacement of contact 89 to the left energizes the motor operated rheostat from the battery 28 through vibrating contact 78 and coil 48. This operates the motor in a direction to decrease the amount of resistance 49 in the field circuit of the main generator and to increase the field strength of this generator.

As shown in Figure 2, the vibrating contacts 77 and 78 are vibrated by coils 91 and 90 respectively, receiving current from the battery 28 through contacts 93 and 92. These contacts open the battery circuit to the coils 90 and 91 when the contacts have been attracted to the coils and thus allow the contacts 77 and 78 to return by spring action. The circuits will again be made on the return, thus causing a new attraction and a continued vibration of the contacts.

It will be seen that on slight displacements of the shaft 95, contact 89 will meet one of the vibrating contacts for only a short period when the latter is at its innermost position of vibration. Under this condition the rheostat 45 will act very slowly. For further displacements of the shaft 95, contact 89 will meet one of the vibrating contacts for a greater length of time and the rheostat 45, will therefore move faster. For extreme displacement of shaft 95, contact 89 will be continuously in touch with one of the vibrating contacts and the rheostat 45 will run continuously. When this occurs, contact 86 will connect battery current through contact 87, if the displacement is to the right, and energize relay 57, which will open contacts 60 and remove the short circuit from around resistance 61, thus quickly decreasing the field strength of the generator 10; and if the displacement is to the left, contact 86 will connect battery current through contact 88 and energize relay 59, thereby quickly reducing the value of resistance 49 in series with the main generator field and quickly increasing the field strength of the main generator.

My metering means is thus used as a relay to maintain the counter torque on the prime mover according to a predetermined function of a quotient of power divided by speed. Expressed mathematically the action of the metering means just described is shown broadly by the following equation where each subscript letter represents a separate element—

$$A_a(B_a \pm k_a A_a) + A_b(B_b \pm k_b A_b) + A_c(B_c \pm k_c A_c) + A_d(B_d \pm k_d A_d) = Kc_e(D_e \pm k_e A_e)$$

placing in the definite functions as they have just been described this equation becomes, where the number subscripts refer to the various generators—

$$I_{10}(E_{10} + k_a I_{10}) + I_{20}(E_{20} + k_b I_{20}) + I_{30}(E_{30} + k_c I_{30}) + I_{40}(E_{40} + k_d I_{40}) = Kk(S - k_e A_a)$$

which is equivalent to—

$$T = \frac{\Sigma(EI)}{S} = M - \frac{k_a I_{10}^2 + k_b I_{20}^2 + k_c I_{30}^2 + k_d I_{40}^2 + NI_{10}}{S}$$

Thus my metering means may be used as a relay to control generator torque at decreasing values as the current (and power) of the generator increases.

As utilized in regulating the torque and described above, a single element only is necessary to provide the restraining torque. Where the restraining force must be an integration of a number of separate factors of independently varying functions as are the current and voltage of each of the separate generators as just explained above, then a separate restraining element will be required for each combination of functions, just as a separate actuating element was provided for each combination of voltage and current in the actuating elements.

In Figure 1 is shown diagrammatically my metering means with eight elements. If it is considered that the elements above the line 3—4 are actuating elements and those below the line 3—4 are restraining elements, then the metering means can be used as a controlling relay for a function of the general type of Equation (1), with five terms in the dividend and three terms in the divisor. It is of course obvious that the metering means allows free choice as to the number of actuating elements and the number of restraining elements, and to the position of these elements in the assembly.

Having described the use of my metering means as a controlling relay, I will now describe its use as a measuring means, and in this I will use as example the measuring of the electrical torque opposing the rotation of a prime mover as given in the above example. This torque may be expressed by the equation—

$$T = k \frac{I_{10}E_{10} + I_{20}E_{20} + I_{30}E_{30} + I_{40}E_{40}}{S}$$

If (in Figure 1) coil $81a$ carries the potential and coil $8\text{-}a$ carries the current of generator $10$, the force produced by element "$a$" will be proportional to $I_{10}E_{10}$. Similarly element "$b$" will be connected to generator $20$, element "$c$" to generator $30$ and element "$d$" to generator $40$. In each element coil $83$ will be suppressed to zero by any well known method, as for instance reducing resistances $84$ to zero. In this way the actuating force will be proportional to—

$$I_{10}E_{10} + I_{20}E_{20} + I_{30}E_{30} + I_{40}E_{40}$$

If now none of the other elements of the metering means are connected to a source of energy except element "$h$", and element "$h$" is connected as a restraining force with coil $82h$ energized by a current proportional to the speed and coil $81h$ energized by a controlled and measured current I, my metering means may be used for measuring the output torque of the combination of generators. At balance of the actuating and restraining elements, then—

$$I_{10}E_{10} + I_{20}E_{20} + I_{30}E_{30} + I_{40}E_{40} = KIs$$

$$I = \frac{I}{K} \frac{I_{10}E_{10} + I_{20}E_{20} + I_{30}E_{30} + I_{40}E_{40}}{S} = cT$$

At balance then, the current through coil $81h$ will be proportional to the combined torque of the generators and will be a direct measure of this torque. Measuring instrument $5$ in series with coil $81h$ may be of the indicating, integrating, or recording type, and by adjustment of resistance $75$ to bring the actuating and restraining elements of my metering means into balance will accurately give a measurement of the torque of the generators.

Where measuring instrument $5$ is of the indicating type, resistance $75$ may be manually operated and the metering means may be brought into balance by adjusting resistance $75$ by hand. However, I prefer that it be brought into balance automatically and where the measuring instrument $5$ is of the integrating or recording type my metering means should be brought into balance by the automatic adjustment of resistance $75$. This is easily accomplished through use of the relay contacts $78$, $89$, and $77$ and/or $88$, $86$, and $87$. Thus, if resistance $75$ is part of motor operated rheostat $45$, operated by contacts $78$, $89$, and $77$, the metering means will be kept in balance, if when the actuating elements overbalance the restraining element motor $46$ is caused to rotate in a direction to reduce resistance $75$ and thus increase the current in coil $81h$ and through the measuring instrument $5$, and if when the restraining element overbalances the actuating elements the current in coil $81h$ and measuring instrument $5$ is automatically reduced.

Many changes can be made in the details without departing from the spirit of my invention, and having described it so that it is readily understandable by one skilled in the art, I claim:

1. A metering means for a rotating machine comprising an actuating element subject to a force proportional to the power of the rotating machine, a restraining element subject to a force proportional to the speed of said rotating machine, and means functionally connecting the actuating element and the restraining element together, whereby the combination meters a function bearing the relationship of a quotient to the forces operating the actuating element and the restraining element, said quotient being proportional to the torque of said rotating machine.

2. A measuring means comprising an actuating element, a similar restraining element in opposition to the actuating element, means functionally connecting the actuating element and restraining element together, separate measuring means responsive to a function acting on one of said elements, controlling means acting to adjust said last mentioned function simultaneously to said last named element and said separate measuring means, and relay contacts brought into connection when the actuating element and the restraining element are out of balance, whereby said controlling means is adjusted and said restraining element brought into balance with said actuating element.

3. A torque relay comprising, an actuating element responsive to power, and a restraining element responsive to speed, means functionally connecting the actuating element and the restraining element, and relay contacts brought into connection when said actuating element does not balance said restraining element.

4. A torque relay comprising a plurality of actuating members each responsive to the power of each of a plurality of generators driven at speeds bearing a constant relationship one to the other, a restraining element responsive to the speed of the generators, means functionally connecting the actuating members and the restraining member, and relay contacts brought into connection when said actuating elements do not balance said restraining element.

5. A metering means comprising an actuating element, a restraining element in opposition to the actuating element, means functionally connecting the actuating element and the restraining element together, contacts brought into connection when the actuating element and restraining element do not balance, one of said contacts having a vibrating member actuated by an electro-magnet.

6. In a metering means, an actuating element and a restraining element, a fixed member and a movable member, said movable member including an element adapted to be brought into contact with a contact making member mounted on a leaf vibrated by an electro-magnet, whereby the time of contact increases with increase in displacement of said movable member.

7. In a torque relay, an actuating element responsive to power, a restraining element responsive to speed, and means functionally connecting said actuating element and said restraining element.

8. In a torque relay, an actuating element responsive to power, a restraining element responsive to speed, means functionally connecting said actuating element and said restraining element, and means modifying said restraining element.

9. In a torque relay, an actuating element responsive to power, a restraining element responsive to speed, means functionally connecting said actuating element and said restraining element, and means modifying said actuating element.

10. In a metering means, a base member, an actuating element and a restraining element, and a movable member having an element adapted to be brought into operable relationship with a contact member comprising a contact, an electromagnet, means functionally connecting said contact and said electro-magnet, and means for supplying an electric current of varying intensity to said electro-magnet whereby said contact is caused to vibrate.

11. In a torque relay, an actuating member substantially responsive to power and a restraining member substantially responsive to speed, and a modifying element connected to control the torque at a decreasing value as the power increases.

12. A metering means having an actuating member, a restraining member of varying strength, means functionally connecting the actuating member and the restraining member, a variable rheostat, a contact which is movable and which moves when the strength of the actuating member varies relative to the strength of the restraining member, said contact being adapted to operate said variable rheostat at increasing speeds with increasing displacement of said contact from its normal position.

13. A metering means having an actuating member, a restraining member of varying strength, means functionally connecting the actuating member and the restraining member, a variable rheostat, a resistance, a plurality of contacts which are movable and which move when the strength of the actuating member varies relative to the strength of the restraining member, one of said contacts being adapted to operate said variable rheostat at increasing speeds with increasing displacement of said contact from its normal position, and another of said contacts being adapted to quickly alter said resistance on approaching its limit of displacement from its normal position.

14. A relay comprising, an actuating element directly responsive to a variable function, a restraining element directly responsive to a second variable function, at least one of said functions comprising a plurality of components one of which is variable, means connecting said actuating element and said restraining element, and further means co-operating with said actuating element responsive to said variable component of one of said variable functions for modifying the quotient of said two variable functions.

15. A relay comprising, an actuating element directly responsive to a variable function, a restraining element directly responsive to a second variable function, at least one of said functions comprising a plurality of components one of which is variable, means connecting said actuating element and said restraining element, and further means co-operating with said restraining element responsive to said variable component of one of said variable functions for modifying the quotient of said two variable functions.

16. A relay comprising, an actuating element directly responsive to a variable function, a restraining element directly responsive to a second variable function, said variable functions comprising a plurality of variable components, means connecting said actuating element and said restraining element, and further means co-operating with said actuating and restraining elements responsive to said certain of variable components for modifying the quotient of said two variable functions.

17. A relay comprising, an actuating element directly responsive to a variable function, a restraining element directly responsive to a second variable function, said variable functions comprising a plurality of variable components, means connecting said actuating element and said restraining element, further means co-operating with said actuating element responsive to one of said variable components of one of said variable functions, and further modifying means co-operating with said restraining element for modifying the quotient of said two variable functions.

HENRY ROSENTHAL.